(12) United States Patent
Ameling et al.

(10) Patent No.: US 11,570,050 B2
(45) Date of Patent: Jan. 31, 2023

(54) METHODS, SYSTEMS AND COMPUTER READABLE MEDIA FOR PERFORMING CABLING TASKS USING AUGMENTED REALITY

(71) Applicant: Keysight Technologies, Inc., Santa Rosa, CA (US)

(72) Inventors: Thomas Ameling, Woodland Hills, CA (US); Winston Wencheng Liu, Woodland Hills, CA (US); Razvan Ionut Stan, Agoura Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 114 days.

(21) Appl. No.: 17/106,857

(22) Filed: Nov. 30, 2020

(65) Prior Publication Data
US 2022/0173967 A1 Jun. 2, 2022

(51) Int. Cl.
*H04L 41/08* (2022.01)
*G06V 20/20* (2022.01)
(Continued)

(52) U.S. Cl.
CPC .......... *H04L 41/0889* (2013.01); *G06T 11/00* (2013.01); *G06V 20/20* (2022.01);
(Continued)

(58) Field of Classification Search
None
See application file for complete search history.

(56) References Cited

U.S. PATENT DOCUMENTS 6,341,158 B1 * 1/2002 Corso, III ............... H04M 3/32
379/22
8,761,811 B2 6/2014 Alonzo
(Continued)

FOREIGN PATENT DOCUMENTS

JP 201849010 A 3/2018

OTHER PUBLICATIONS

Non-Final Office Action for U.S. Appl. No. 16/788,272 (dated Feb. 17, 2022).
(Continued)

*Primary Examiner* — David H Chu (57) ABSTRACT

A method for configuring a network service system for performing a network service using AR comprises: at a user device executing an AR cabling application: communicating, to an AR cabling subsystem of the network service system, network service task identification information usable for identifying at least one testing or monitoring case (TMC) definition provisioned within the network service system; receiving, from the AR cabling subsystem of the network service system, cabling instructions based on the network service task identification information, wherein the cabling instructions is for instructing the user to perform a cabling task associated with the at least one TMC definition, wherein the cabling task involves connecting at least one cable to one or more physical ports of a physical resource of the network service system; and providing, via a display and using at least one AR element, the cabling instructions for instructing the user to perform the cabling task.

20 Claims, 5 Drawing Sheets

(51) Int. Cl.
*G06T 11/00* (2006.01)
*G09B 5/04* (2006.01)
*G09B 19/00* (2006.01)
*G09B 5/02* (2006.01)
*H04L 41/0806* (2022.01)

(52) U.S. Cl.
CPC .................. *G09B 5/02* (2013.01); *G09B 5/04* (2013.01); *G09B 19/003* (2013.01); *H04L 41/0806* (2013.01)

(56) References Cited

U.S. PATENT DOCUMENTS

| | | | |
|---|---|---|---|
| 8,773,467 | B2 | 7/2014 | Chen-Quee et al. |
| 9,401,849 | B2* | 7/2016 | Tanaka ................... H04L 41/145 |
| 9,672,648 | B2 | 6/2017 | Park et al. |
| 9,918,190 | B2 | 3/2018 | Bourque et al. |
| 9,959,674 | B2 | 5/2018 | Chen et al. |
| 10,109,108 | B2 | 10/2018 | Miller et al. |
| 10,288,432 | B1 | 5/2019 | Sokolov et al. |
| 10,332,314 | B2* | 6/2019 | Oar ...................... H04L 43/0811 |
| 10,423,866 | B2 | 9/2019 | Guionneau et al. |
| 10,438,409 | B2 | 10/2019 | Todeschini et al. |
| 10,581,199 | B2* | 3/2020 | Werner ................ H01R 13/465 |
| 10,663,302 | B1 | 5/2020 | Shen |
| 10,666,768 | B1 | 5/2020 | Johnson |
| 2002/0095487 | A1 | 7/2002 | Day et al. |
| 2003/0158652 | A1 | 8/2003 | Friedrichs et al. |
| 2005/0102098 | A1 | 5/2005 | Montealegre et al. |
| 2005/0111491 | A1* | 5/2005 | Caveney ............... H04M 3/229 370/475 |
| 2008/0126002 | A1* | 5/2008 | Chang ............. G01R 31/31926 702/120 |
| 2011/0287811 | A1 | 11/2011 | Mattila et al. |
| 2012/0249588 | A1* | 10/2012 | Tison .................... G06V 20/20 382/103 |
| 2012/0313963 | A1 | 12/2012 | Chen-Quee et al. |
| 2013/0050262 | A1 | 2/2013 | Jeon |
| 2013/0191855 | A1* | 7/2013 | Godas .................... H04N 7/104 725/22 |
| 2013/0246026 | A1 | 9/2013 | Ceglia et al. |
| 2014/0236475 | A1 | 8/2014 | Venkatraman et al. |
| 2014/0278053 | A1 | 9/2014 | Wu et al. |
| 2014/0330511 | A1* | 11/2014 | Tison .................... G06T 19/006 701/428 |
| 2015/0049905 | A1 | 2/2015 | Chudy et al. |
| 2015/0109334 | A1 | 4/2015 | Park et al. |
| 2015/0363647 | A1 | 12/2015 | Perez et al. |
| 2016/0035246 | A1 | 2/2016 | Curtis |
| 2016/0140868 | A1 | 5/2016 | Lovett et al. |
| 2017/0018274 | A1* | 1/2017 | German ................. G10L 15/22 |
| 2017/0091607 | A1 | 3/2017 | Emeis et al. |
| 2018/0062869 | A1 | 3/2018 | Nugent et al. |
| 2018/0234330 | A1* | 8/2018 | Johnsen ................ H04L 41/40 |
| 2018/0268220 | A1 | 9/2018 | Lee et al. |
| 2018/0335308 | A1 | 11/2018 | Zavesky et al. |
| 2019/0041637 | A1* | 2/2019 | German ................ G06T 19/006 |
| 2019/0050310 | A1 | 2/2019 | Wooton et al. |
| 2019/0057548 | A1* | 2/2019 | Singh ..................... G06Q 10/20 |
| 2019/0281473 | A1 | 9/2019 | Liao et al. |
| 2019/0294841 | A1 | 9/2019 | Hall et al. |
| 2019/0341723 | A1* | 11/2019 | Werner ................ G06T 19/006 |
| 2020/0250430 | A1 | 8/2020 | Kishore et al. |
| 2020/0250863 | A1* | 8/2020 | Shetty ..................... H04Q 1/16 |
| 2020/0252302 | A1 | 8/2020 | Lairsey et al. |
| 2020/0253079 | A1 | 8/2020 | Lairsey et al. |
| 2020/0294265 | A1 | 9/2020 | Kimura |
| 2021/0056766 | A1 | 2/2021 | Price et al. |
| 2021/0232819 | A1* | 7/2021 | VanBlon ................ G06F 3/017 |
| 2021/0406764 | A1 | 12/2021 | Sha et al. |

OTHER PUBLICATIONS

Commonly-Assigned, Co-pending U.S. Appl. No. 16/788,272 for "Methods, Systems and Computer Readable Media for Augmented Reality Navigation in Network Test Environments," (Unpublished, filed Feb. 11, 2020).

Kasprzak et al., "Feature-based Indoor Navigation using Augmented Reality," School of Engineering & Computing Glasgow Caledonian University, pp. 1-8 (Nov. 25, 2019).

Makarov, "How Augmented Reality-based Indoor Navigation Works," https://mobidev.biz/blog/augmented-reality-indoor-navigation-app-developement-arkit, pp. 1-22 (Jul. 30, 2019).

Tillman et al., "Apple ARKit explained: Everything you need to know about Apple's augmented reality platform," Pocket-lint Limited, pp. 1-7 (Jun. 2019).

Mendez, "Update: Indoor Real-Time Navigation with SLAM on Your Mobile," https://community.arm.com/developer/tools-software/graphics/b/blog/posts/indoor-real-time-navigation-with-slam-on-your-mobile, pp. 1-29 (Nov. 7, 2018).

Flinton et al., "NETIVAR: NETwork Information Visualization based on Augmented Reality," 2018 12th International Conference on Software, Knowledge, Information Management & Applications (SKIMA), pp. 1-9 (2018).

Antunes, "Blippar's AR tech does indoor navigation without SLAM or beacons," https://www.spar3d.com/news/related-new-technologies/blippars-ar-tech-does-indoor-navigation-without-slam-or-beacons/, pp. 1-4 (Aug. 21, 2018).

Herbert et al., "An AR Network Cabling Tutoring System for Wiring a Rack," International Conference on Artificial Reality and Telexistence Eurogenics Symposium on Virtual Environments, pp. 1-2 (2017).

Dey et al., "An Evaluation of Augmented Reality X-Ray Vision for Outdoor Navigation," The 21st International Conference on Artificial Reality and Telexistence, pp. 28-32 (Nov. 2011).

Henderson et al., "Augmented Reality for Maintenance and Repair (ARMAR)", Columbia University Department of Computer Scient, pp. 1-70, (Aug. 2007).

Kasprzak et al., "Feature-based Indoor Navigation using Augmented Reality," 2013 9th International Conference on Intelligent Environments, pp. 1-8 (Jul. 2013).

Final Office Action for U.S. Appl. No. 16/788,272 (dated Sep. 2, 2022).

Applicant-Initiated Interview Summary for U.S. Appl. No. 16/788,272 (dated Nov. 9, 2022).

Advisory Action for U.S. Appl. No. 16/788,272 (dated Dec. 12, 2022).

\* cited by examiner

METHODS, SYSTEMS AND COMPUTER READABLE MEDIA FOR PERFORMING CABLING TASKS USING AUGMENTED REALITY

TECHNICAL FIELD

The subject matter described herein relates to augmented reality (AR). More particularly, the subject matter described herein relates to methods, systems, and computer readable media for performing cabling tasks using AR.

BACKGROUND

Network operators may manage and configure a significant number of physical resources, e.g., network switches, servers, monitoring devices, and/or security devices. While some configuration is software based, some configuration may involve manual tasks including cabling tasks. For example, a network switch may be connected to a number of devices (e.g., servers, security appliances, and/or other network switches) via one or more cables. In this example, communications can be hindered or obstructed if the cables are connected incorrectly, e.g., management ports may be used for communicating management traffic originating from management nodes, while data ports may be used for communicating user traffic originating from user equipment. Since the complexity of cabling tasks can increase significantly as the amount of physical resources are added or interconnected, the amount of time required for such cabling tasks can also increase. Further, increased complexity of cabling tasks can also increase the probability of erroneous connections and/or related configuration issues.

SUMMARY

The subject matter described herein includes methods, systems, and computer readable media for performing cabling tasks using augmented reality (AR). A method for configuring a network service system for performing a network service using AR comprises: at a user device of a network service system user, wherein the user device is executing an AR cabling application associated with the network service system: communicating, to an AR cabling subsystem of the network service system, network service task identification information, wherein the network service task identification information is usable for identifying at least one testing or monitoring case (TMC) definition provisioned within the network service system; receiving, from the AR cabling subsystem of the network service system, cabling instructions based on the network service task identification information, wherein the cabling instructions is for instructing the user to perform a cabling task associated with the at least one TMC definition, wherein the cabling task involves connecting at least one cable to one or more physical ports of a physical resource of the network service system; and providing, via a display and using at least one AR element, the cabling instructions for instructing the user to perform the cabling task.

A system for configuring a network service system for performing a network service using AR comprises a user device of a network service system user; and at least one processor, wherein the user device is executing an AR cabling application using the at least one processor, wherein the AR cabling application is further configured for: communicating, to an AR cabling subsystem of the network service system, network service task identification information, wherein the network service task identification information is usable for identifying at least one TMC definition provisioned within the network service system; receiving, from the AR cabling subsystem of the network service system, cabling instructions based on the network service task identification information, wherein the cabling instructions is for instructing the user to perform a cabling task associated with the at least one TMC definition, wherein the cabling task involves connecting at least one cable to one or more physical ports of a physical resource of the network service system; and providing, via a display and using at least one AR element, the cabling instructions for instructing the user to perform the cabling task.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
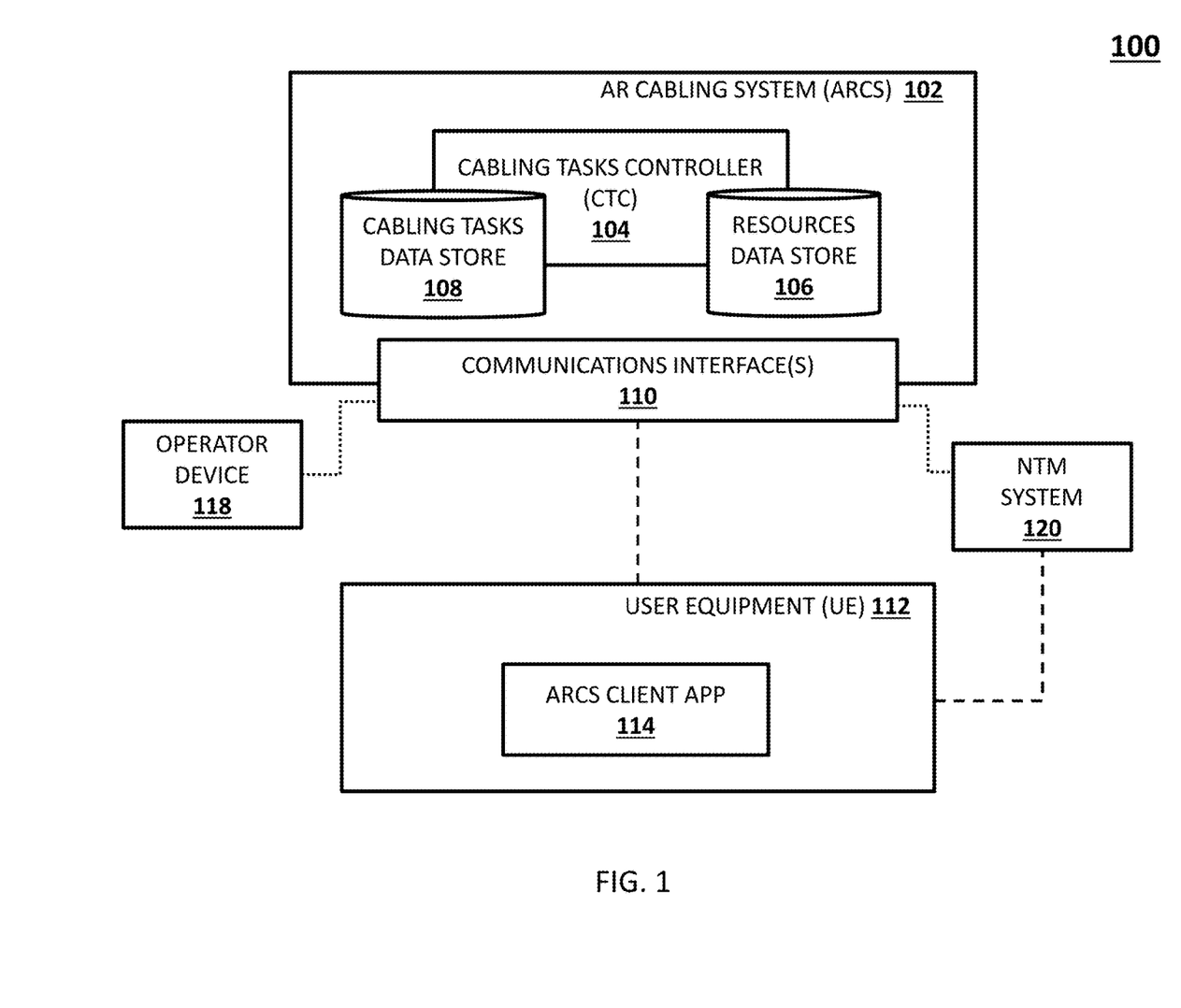
FIG. 1 is a block diagram illustrating an example environment including an augmented reality (AR) cabling system for providing cabling instructions.

FIG. 1 is a block diagram illustrating an example environment 100 including an augmented reality (AR) cabling system (ARCS) 102 for providing cabling instructions and/ or performing related functionality. Referring to FIG. 1, environment 100 may include ARCS 102, user equipment (UE) 112, an operator device 118, and a network testing or monitoring (NTM) system 120. ARCS 102 may represent any suitable entity (e.g., one or more computing platforms or a device implemented using at least one processor) for performing various aspects associated with providing AR cabling instructions. For example, ARCS 102 may receive a request for cabling instructions for performing a cabling task associated with connecting one or more cables (e.g., an Ethernet cable, an direct-attach cable (DAC), a fiber optic cable, a network cable, etc.) to one or more ports of a physical resource (e.g., a network switch or a server). In this example, after determining cabling instructions for performing the cabling task, ARCS 102 may provide the cabling instructions to a requesting entity, e.g., an ARCS client app 114 executing on UE 112. Continuing with this example, ARCS client app 114 may present or provide the cabling instructions using AR, e.g., by augmenting video and/or images to include visual overlays, text, and/or animations for instructing a user on connecting one or more cables to one or more ports.

In some embodiments, ARCS 102 may include a cabling tasks controller (CTC) 104, a resources data store 106, a cabling tasks data store 108, and one or more communications interface(s) 110. CTC 104 may represent any suitable entity or entities (e.g., software executing on at least one processor) for performing various aspects associated with providing cabling instructions or related services. For example, CTC 104 may receive a request (e.g., from ARCS client app 114) for instructions for performing a cabling task (e.g., a task involving connecting at least one cable to one or more ports of a physical resource, e.g., a network router or switch, a firewall device, or a security appliance). In this example, CTC 104 may use an identifier (e.g., a quick response (QR) code or serial number from a video or image of the physical resource) sent in the request or a related message to identify or determine appropriate cabling task related information (e.g., cabling instructions, port/connection information, and/or AR guidance information) for performing the cabling task. Continuing with this example, after determining the appropriate cabling task related information, CTC 104 may send the cabling instructions and/or related information to a requesting entity (e.g., ARCS client app 114) which can present the cabling instructions using one or more AR elements, e.g., visual overlays, such as a yellow box, emphasizing particular ports to connect a cable to.

In some embodiments, ARCS 102 and/or CTC 104 may include functionality for confirming that a cabling task is completed and/or for providing feedback indicating whether the user is following the cabling instructions. For example, ARCS 102 and/or CTC 104 may perform one or more functions (e.g., executing a ping scan and/or a network discovery procedure) for indicating that a cabling task or a portion thereof has been completed or performed correctly. In another example, ARCS 102 and/or CTC 104 may trigger NTM system 120 or a related entity to perform one or more testing and/or monitoring functions (e.g., executing a management query or command) for indicating that a cabling task or a portion thereof has been completed or performed correctly.

In some embodiments, ARCS 102 and/or CTC 104 may include functionality for storing, accessing, and/or utilizing cabling task related information in one or more data stores, e.g., resources data store 106 and cabling tasks data store 108. Example cabling task related information may include information about physical resources that are configurable (e.g., connectible) and information for performing one or more cabling tasks associated with the one or more physical resources.

Resources data store 106 may represent any suitable entity (e.g., a computer readable medium, a database, a storage device, or memory) for storing various information about physical resources (e.g., QR codes, serial numbers, device images or visual identifiers, and/or physical port layouts) and/or other data. In some embodiments, resources data store 106 may include physical port layouts or diagrams, technical specifications, and/or other resource information indexable or identifiable using resource identifiers. For example, resources data store 106 may store visual identifiers (e.g., images depicting port panel views of resources, images of QR codes, images of internet protocol (IP) addresses or serial numbers) usable for identifying particular physical resources or related physical resource identifiers, e.g., uniform resource identifiers (URIs) or unique resource identifiers. In another example, in lieu of or in addition to visual identifiers, resources data store 106 may store resource identifiers (e.g., serial numbers, fully qualified domain name (FQDNs), or universally unique identifier (UUIDs)) that are encoded in near-field communication (NFC) or radio-frequency identification (RFID) chips affixed to or contained within physical resources.

Cabling tasks data store 108 may represent any suitable entity (e.g., a computer readable medium, a database, a storage device, or memory) for storing cabling task related information (e.g., cabling instructions for performing various cabling tasks) associated with one or more physical resources, and/or other data. For example, cabling tasks data store 108 may store sets of cabling instructions (e.g., text, audio, and/or graphics usable for AR related presentation) usable for instructing a user to perform cabling tasks or portion(s) thereof. In this example, the sets of cabling instructions may be indexed or otherwise identifiable using cabling task identifiers and/or resource identifiers.

In some embodiments, resources data store 106, cabling tasks data store 108, or another data store may include a testing or monitoring case (TMC) library for receiving and storing one or more TMC definitions for defining one or more testing objectives (e.g., tests to perform for particular environments or scenarios) and/or monitoring objectives (e.g., traffic or behavior to observe in particular scenarios or environments) performable by NTM system 120 or a related entity.

In some embodiments, a TMC definition may include various information for performing a testing or monitoring objective or related tasks. For example, a TMC definition may define a testing objective including test traffic that is to be generated and sent to or towards a device under test (DUT) or system under test (SUT) when performing a test event, performance metrics to be computed during or after the test event, and/or other TMC configuration information associated with configuring NTM system 120 or other elements associated with the test event. In another example, a TMC definition may define a monitoring objective including taps or probes to use when performing a monitoring event, performance metrics to be computed during or after the monitoring event, and/or other TMC configuration information associated with configuring NTM system 120 or other elements associated with the monitoring event.

In some embodiments, a TMC definition may include a connectivity map or information usable in creating a connectivity map. For example, a connectivity map may indicate which ports of NTM system 120 are connected to ports of a SUT or system being monitored.

In some embodiments, resources data store 106, cabling tasks data store 108, or another data store may include a device connectivity library for storing device image recognition and/or device identification information and associated device-specific communication port AR overlay information. For example, a device connectivity library may include device identifiers and related AR element information usable for assisting a user with performing a cabling task or portion thereof (e.g., audio instructions and overlay graphics and relative anchor location information for emphasizing particular ports of e.g., a computer server or a network switch).

In some embodiments, an NTM user may configure or generate a testing case definition, a testing objective or event, and/or one or more related cabling tasks within NTM system 120 or using a related interface. For example, a TMC definition related to a testing objective may involve generating test packet traffic that is directed to or towards a SUT or DUT. In this example, the TMC definition related to the testing objective may include cabling instructions for connecting associated test infrastructure components (e.g., test traffic generators/ports, test traffic receivers/ports, switches/ports, routers/ports, gateways/ports, servers/ports, etc.). In this example, the TMC definition related to the monitoring objective may be communicated to ARCS 102 and/or stored in data store 108.

Example testing related cabling instructions may refer to test component infrastructure and/or DUT or SUT identifier information (e.g., device or port visual images, NFC tag-encoded device or port identifier, RFID tag-encoded device or port identifier, QR code-encoded device or port identifier, etc.) usable for uniquely identifying a component or resource (e.g., DUT, switch, router, gateway, server, etc.) associated with a testing objective. For example, testing objective related cabling instructions may declare that for a particular testing objective or event, a port '4' of test traffic generator 'X' should be connected to a port '3' of a DUT 'Y'. In this example, a test system operator, e.g., using ARCS client app 114 on their UE 112, can access ARCS 102 as described herein to obtain AR-based cabling guidance for one or more defined network testing objectives.

In some embodiments, an NTM user may configure or generate a monitoring case definition, a monitoring objective or event, and/or one or more related cabling tasks within NTM system 120 or using a related interface. For example, a TMC definition related to a monitoring objective may involve observing live traffic across a monitored network via the use of inline taps, probes, bypass switches, or other visibility components. In this example, the TMC definition related to the monitoring objective may include cabling instructions for connecting associated monitoring infrastructure components (e.g., inline taps, probes, bypass switches, etc.). In this example, the TMC definition related to the monitoring objective may be communicated to ARCS 102 and/or stored in data store 108.

Example monitoring related cabling instructions may refer to monitoring component infrastructure and/or monitored network component identifier information (e.g., device or port visual images, NFC tag-encoded device or port identifier, RFID tag-encoded device or port identifier, QR code-encoded device or port identifier, etc.) usable for uniquely identifying a component or resource (e.g., a monitored network component or element, switch, router, gateway, server, inline taps, probes, bypass switches, etc.) associated with a network monitoring objective. For example, network monitoring objective related cabling instructions may declare that for a particular monitoring objective or event, a port '2' of bypass switch 'X' should be connected to a port '1' of a monitored network device 'Y'. In this example, a monitoring system operator, e.g., using ARCS client app 114 on their UE 112, can access ARCS 102 as described herein to obtain AR-based cabling guidance for one or more defined network monitoring objectives.

Communications interface(s) 110 may represent any suitable entities (e.g., network interface cards (NICs), port modules, and/or other hardware or software) for receiving and sending communications via various communications protocols and/or data formats. For example, communications interface(s) 110 may include a configuration interface for configuration various settings of ARCS 102. In another example, communications interface(s) 110 may include a user interface (UI), a graphical UI (GUI), and/or an application programming interface (API) for allowing operator device 118 or another entity to interact with ARCS 102.

Operator device 118 may be any entity (e.g., an automated system or a device or system controlled or controllable by a human user) for selecting, viewing, and/or configuring various aspects associated with ARCS 102 or CTC 104. For example, operator device 118 may provide configuration information to ARCS 102 via communications interface(s) 110. Example UIs for interacting with ARCS 102 or CTC 104 may support automation (e.g., via one or more scripting languages), a representation state transfer (REST) API, a command line, and/or a web based GUI. In another example, operator device 118 may provide cabling task related information (e.g., predetermined cabling instructions for various physical resources) for storage in one or more data stores, e.g., resources data store 106 and cabling tasks data store 108.

NTM system 120 may represent any suitable entity (e.g., one or more computing platforms or devices implemented using at least one processor) for performing various aspects associated with monitoring or testing one or more networks (e.g., enterprise networks, telecommunications network, etc.) or physical resources. For example, NTM system 120 may include or interact with various hardware or physical resources (e.g., platforms, chassis, port modules, devices, etc.) that are located in different physical locations (e.g., different lab rooms in the same building, different buildings on the same campus, etc.). In this example, physical resources may include test system components as well as components of a DUT or SUT.

In some embodiments, NTM system 120 may include functionality for confirming that a cabling task is completed. For example, ARCS client app 114 or another entity may trigger NTM system 120 or a related node to perform one or more testing or monitoring functions for determining whether a physical resource is appropriately connected. In this example, if the physical resource is inappropriately connected, additional cabling instructions (e.g., cabling instructions for remediating the connection issue) may by requested from ARCS 102 and/or provided to ARCS client app 114.

In some embodiments, an NTM user may configure a TMC definition, a related objective, and/or one or more cabling tasks within the NTM system 120 or using a related interface. For example, using a GUI, a NTM user may input data and/or select a test traffic template or a monitoring layout for performing a testing objective or monitoring objective. In this example, an NTM application may use this input to generate or modify a TMC definition and send the TMC definition to ARCS 102 and/or store this TMC definition in a data store, e.g., data store 108 or a TMC library.

In some embodiments, NTM system 120 or a related entity may include functionality for executing one or more TMCs or related objectives. For example, a TMC execution engine may receive a TMC definition or related information, e.g., configuration instructions associated with a TMC. In this example, the TMC execution engine may provide the configuration instructions to various NTM system components (e.g., traffic generators and/or network taps) via various ports or connections. In this example, the configuration instructions may be communicated to various test system components via an internal physical or virtual bus.

In some embodiments, NTM system 120 or a related entity may generate test traffic using one or more TMC templates or related traffic flows based on a TMC definition or related information. For example, a traffic generator may generate a number of test packets for performing testing objectives indicated in a TMC definition, e.g., testing a SUT that includes a physical resource involved in an AR assisted cabling task. In another example, a traffic generator may generate test traffic based on one or more test traffic template (s) indicated by a TMC definition or related information.

UE 112 may represent any suitable entity (e.g., a smart phone, a mobile device, a laptop, one or more computing platforms, etc.) for performing various aspects associated with using AR related cabling services. In some embodiments, UE 112 may include a camera, a display, and hardware and software for running various applications, such as an ARCS client app 114 and/or other applications. ARCS client app 114 may be programmed or configured to interact with ARCS 102 or CTC 104. In some embodiments, ARCS client app 114 may interact with NTM system 120 and/or may trigger ARCS 102 to interact with NTM system 120.

In some embodiments, ARCS client app 114 may be configured for communicating, to ARCS 102, TMC definition identification information indicating at least one TMC definition; communicating, to ARCS 102, resource identification information indicating a physical resource; receiving, to ARCS 102, cabling instructions for instructing the user to perform a cabling task associated with the at least one TMC definition, wherein the cabling task involves connecting at least one cable to one or more physical ports of the physical resource; and providing, via a display and using at least one AR element, the cabling instructions for instructing the user to perform the cabling task.

In some embodiments, ARCS client app 114 may provide a GUI or other user interface for obtaining user input. For example, a GUI of ARCS client app 114 may provide a list of available TMCs or related cabling tasks that a user can select. In this example, after selecting a TMC or a related cabling task, ARCS 102 or ARCS client app 114 may instruct (e.g., via the GUI of ARCS client app 114) the user to point a camera of UE 112 at a QR code affixed to a relevant physical resource and/or at a port panel (e.g., the back or front area) of a relevant physical resource.

In some embodiments, ARCS client app 114 may utilize an AR kit or other software to perform image recognition on video frames captured by a camera of UE 112 and may use this technology to derive or obtain resource identification information (e.g., a machine ID decal, an IP address sticker, or a QR code) affixed to a physical resource.

In some embodiments, ARCS client app 114 may utilize an NFC and/or RFID hardware or related software to detect and read resource identification information (e.g., UUIDs) encoded in NFC or RFID chips affixed to or contained within physical resources.

In some embodiments, ARCS client app 114 may request and receive cabling task related information (e.g., cabling instructions) from ARCS 102 or CTC 104 for one or more physical resources and may utilize an AR kit (e.g., ARKit 3 or ARKit 4) or other software to display cabling task related information using one or more AR elements. For example, after receiving a cabling instruction for connecting a cable into port '4' of a particular network switch, ARCS client app 114 may overlay a bright yellow square over port '4' in a live or substantially live video of the back of the network switch. In this example, ARCS client app 114 may overlay text, animations, or visual instructions to the video for indicating that the user should connect one end of the cable into port '4'. In another example, in lieu or in addition to visual overlays, ARCS client app 114 may utilize speakers of UE 112 to play audio instructions or provide audio feedback, e.g., augmenting a live or substantially live video's audio stream using a chime sound when a successful completion of the instruction is detected or using a buzzer sound when it is detected that an instruction is performed incorrectly such as plugging the cable into the wrong port. In another example, in lieu or in addition to visual overlays, ARCS client app 114 may utilize a vibration motor of UE 112 to create vibrations or buzzes for instructing a user to do or not do an action.

It will be appreciated that FIG. 1 is for illustrative purposes and that various depicted entities, their locations, and/or their functions described above in relation to FIG. 1 may be changed, altered, added, or removed.

Figure 2:
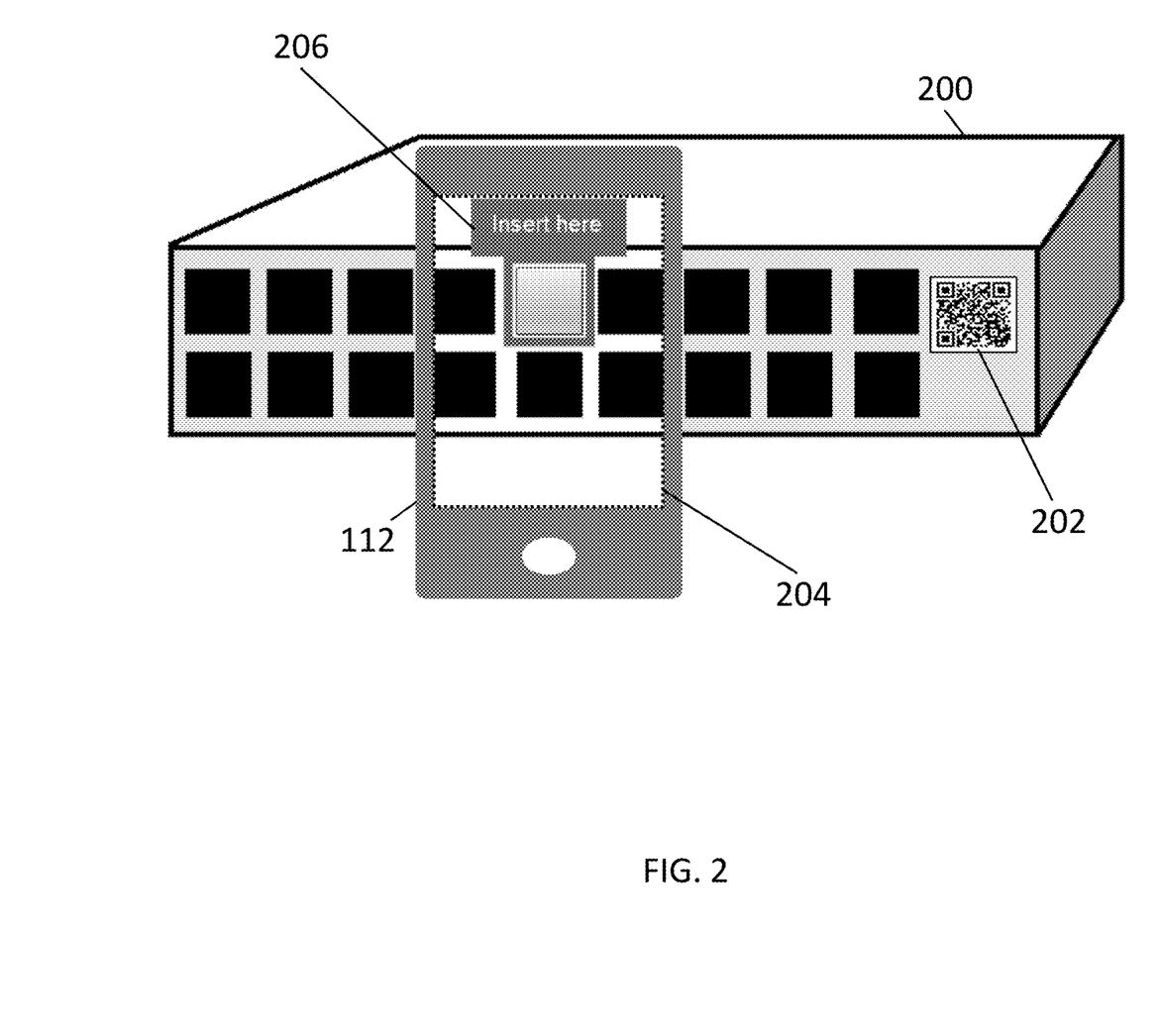
FIG. 2 is a block diagram illustrating an example physical resource associated with a cabling task.

FIG. 2 is a block diagram illustrating an example physical resource 200 associated with a cabling task. Physical resource 200 may represent any suitable entity (e.g., a network router or switch, a firewall device, or a security appliance, etc.) that includes one or more physical ports or jacks for receiving various connectors. For example, physical resource 200 may be a network switch with multiple ports for receiving connectors or plugs of network cables.

In some embodiments, physical resource 200 may have various visual characteristics usable for identifying itself. For example, a color, a logo or related markings, and a physical port layout of physical resource 200 may indicate a particular model or brand of security appliance. In another example, physical resource 200 may be identifiable based on one or more resource identifiers (e.g., a UUID, a QR code, and/or an IP address) located on physical resource 200 or encoded in RFID chips or NFC chips.

QR code 202 represents a QR code affixed to physical resource 200 usable for identifying physical resource 200. For example, ARCS client app 114 may extract a QR code or related resource identifier using a camera, a QR reader, and/or related functionality on UE 112 and may send the resource identifier to ARCS 102 and/or CTC 104 for obtaining cabling task related information. In another example, ARCS client app 114 may send an image of a captured QR code or a video segment containing the QR code to ARCS 102 and/or CTC 104 and allow ARCS 102 and/or CTC 104 to determine a relevant resource identifier from the image or video segment.

In some embodiments, after receiving cabling instructions for performing a cabling task associated with physical resource 200, UE 112 or ARCS client app 114 executing thereon may provide, via a display 204, an AR enhanced live (e.g., real-time or near real-time) video depicting physical ports of physical resource 200 along with an overlay element 206 that indicates to a user which physical port to insert a cable. In such embodiments, overlay element 206 may be generated and displayed by ARCS client app 114 using an AR toolkit based on cabling instructions and related information. In some embodiments, overlay element 206 may be interactive or dynamic so as to draw the user's eye and/or focus, e.g., overlay element 206 may blink, expand and contract, or jiggle as the user moves UE 112 across the physical ports of physical resource 200.

It will be appreciated that FIG. 2 is for illustrative purposes and that various depicted entities, their locations, and/or their functions described above in relation to FIG. 2 may be changed, altered, added, or removed.

Figure 3:
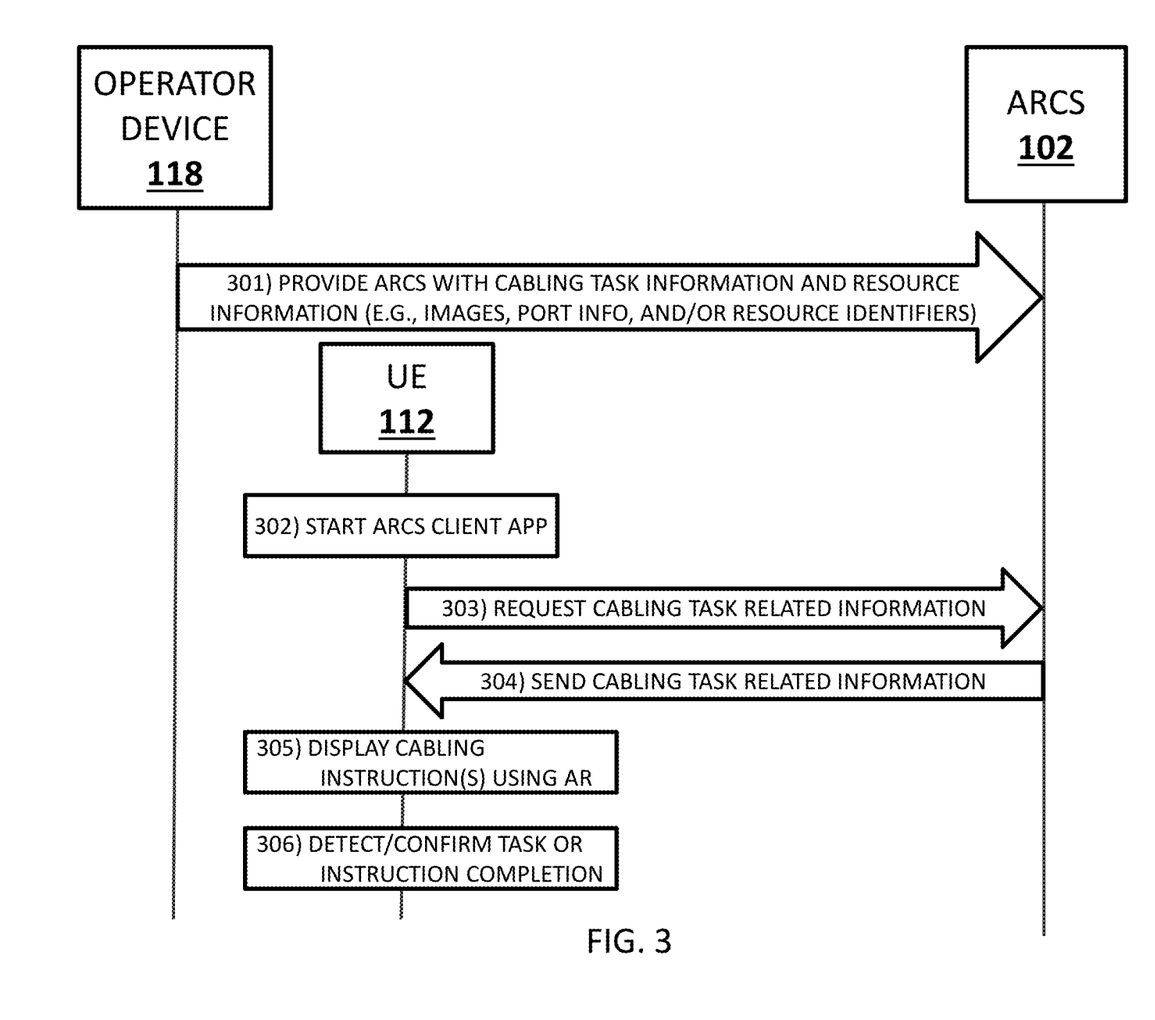
FIG. 3 depicts a message flow diagram illustrating user equipment interacting with an AR cabling system.

FIG. 3 depicts a message flow diagram illustrating UE 112 interacting with ARCS 102. In some embodiments, ARCS 102 may be configured or provisioned with various cabling task related information and resource information. For example, an ARCS operator may store in data stores 106 and 108 information about various physical resources along with cabling instructions and/or information for generating or displaying AR elements for instructing a user to perform a cabling task involving one or more of the physical resources.

In some embodiments, e.g., prior to a user using ARCS client app 114, various physical resources may be assigned identifiers and the identifiers may be encoded as a QR code, an RFID value, and/or an NFC value. In such embodiments, each physical resource may be labeled or otherwise tagged with these resource identifiers such that a user can scan or otherwise obtain the embedded identifiers using ARCS client app 114 and/or UE 112.

Referring to FIG. 3, in step 301, cabling task related information and resource information may be provided to ARCS 102 from operator device 118 or another entity. For example, a network operator or management system may generate predefined cabling instructions for performing one or more cabling tasks involving physical resource 200 and may provide the predefined cabling instructions along with related resource information about physical resource 200 to ARCS 102 or one or more related data stores.

In step 302, ARCS client app 114 may be started or opened on UE 112. For example, after starting ARCS client app 114 and selecting or indicating a particular TMC, user may point a camera of UE 112 at a QR code affixed to physical resource 200 or may retrieve a resource identifier from a NFC or RFID chip in or near physical resource 200. In this example, ARCS client app 114 may display on the screen of UE 112 what the camera is viewing in real-time or near real-time.

In step 303, ARCS client app 114 may provide cabling task identification information (e.g., a derived UUID and a user-provided TMC identifier) when requesting cabling task related information associated with physical resource 200. For example, UE 112 running ARCS client app 114 may be configured to scan and interpret or resolve a visual code (e.g., QR code) that is affixed to the surface of physical resource 200. In this example, ARCS client app 114 or a related third party code scanner may resolve the visual code to obtain an encoded serial number or another identifier usable for identifying physical resource 200.

In some embodiments, in lieu of or in addition to scannable visual codes, resource identifiers (e.g., serial numbers and/or UUIDs) may be encoded in NFC or RFID chips that are affixed to or contained within physical resource 200. In such embodiments, ARCS client app 114 may use or access an NFC or RFID scanner (e.g., on UE 112) and may use this scanner to extract or obtain the resource identifiers.

In step 304, ARCS 102 or CTC 104 therein may use the provided information from UE 112 or ARCS client app 114 to identify relevant cabling task related information and may send the cabling task related information to UE 112 or ARCS client app 114. For example, ARCS 102 or CTC 104 therein may use received cabling task identification information (e.g., a resource identifier, a cabling task identifier, and/or a TMC identifier) from ARCS client app 114 to identify or determine cabling task related information associated with physical resource 200 and then send that cabling task related information to ARCS client app 114.

In step 305, ARCS client app 114 may display one or more cabling instructions using AR. For example, after receiving cabling instructions for connecting one end of a cable into a port '2' of physical resource 200 and another end of the cable into a port '4' of physical resource 200, ARCS client app 114 may augment a live or substantially live video showing port '2' and port '4' of physical resource 200 with an instructive animation depicting a cable being connected into these ports.

In step 306, ARCS client app 114 or a related entity may detect and/or confirm that one or more cabling instructions are completed successfully. For example, ARCS client app 114 may detect (e.g., by analyzing a video portion or image from a camera of UE 112) that a cable has been inserted into a particular port. In this example, after detecting that the cable has been inserted into that port, ARCS client app 114 may execute or trigger (e.g., via ARCS 102 and/or NTM system 120) a network communications test to confirm that the cable has been inserted, e.g., by determining that communications via the connection is successful.

It will be appreciated that FIG. 3 is for illustrative purposes and that various depicted messages and details for training ARCS 102 or related aspects described above in relation to FIG. 3 may be changed, altered, added, or removed.

Figure 4:
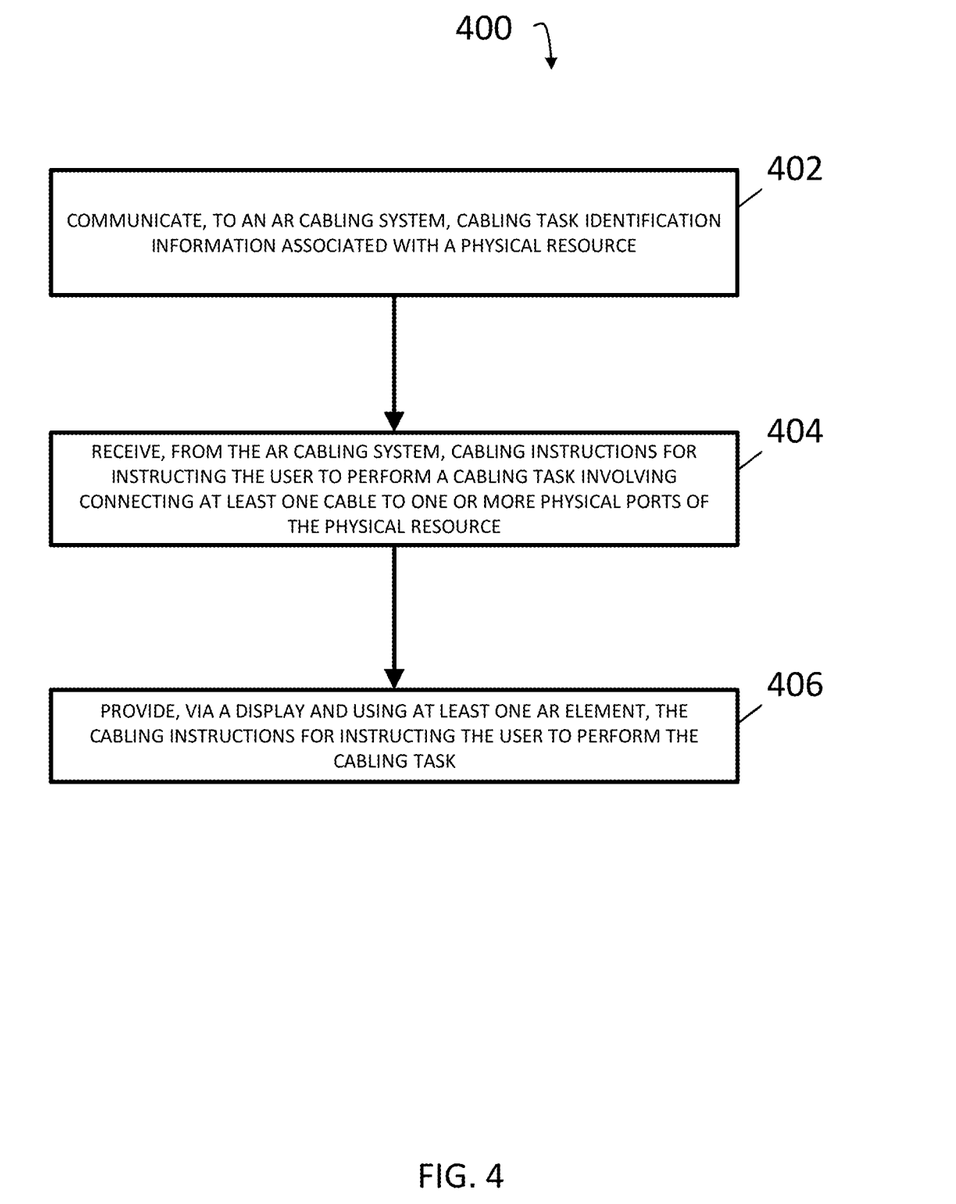
FIG. 4 is a flow chart illustrating an example process for performing cabling tasks using AR.

FIG. 4 is a diagram illustrating an example process 400 for performing cabling tasks using AR. In some embodiments, process 400, or portions thereof, may be performed by or at ARCS 102, CTC 104, UE 112, ARCS client app 114, and/or another node or module. In some embodiments, process 400 may include operations or actions represented by steps 402, 404, and/or 406.

Referring to process 400, in step 402, cabling task identification information associated with a physical resource may be communicated to ARCS 102. In some embodiments, cabling task identification information is usable for identifying at least one TMC definition indicating at least one testing or monitoring objective involving the physical resource.

In some embodiments, cabling task identification information may include resource identification information usable for identifying a physical resource in a real-world network environment. For example, a user of UE 112 may send a resource identifier obtained from a video clip or from an RFID or NFC chip along with a request for cabling instructions associated with a physical resource indicated by the resource identifier.

In some embodiments, cabling task identification information may include TMC definition identification information usable for identifying at least one TMC definition. For example, a user of UE 112 may select, via a GUI of displaying a visual menu depicting multiple TMCs, a TMC or a related TMC identifier that indicates a TMC definition involving physical resource 200. In this example, the TMC definition may include information usable for testing or monitoring various aspects of physical resource 200, e.g., network related latency, performance, congestion, compliance, security, and/or throughput.

In some embodiments, a user may use UE 112 to access, e.g., via ARCS client app 114 or a related GUI, a menu of available TMC definitions from which one may be selected. Once a particular TMC is selected, the user may use UE 112 to provide resource identification information to ARCS 102, in a manner described above. Similar processes may be followed in various embodiments used for network monitoring or network testing.

In some embodiments, cabling task identification information or resource identification information may include a resource identifier obtained or determined using UE 112. For example, UE 112 can read a resource identifier from an RFID or NFC chip affixed to a physical resource. In another example, UE 112 can identify a resource identifier in an image using OCR technology. In another example, a user can identify a resource identifier by selecting a physical resource via a GUI executing on UE 112.

In some embodiments, cabling task identification information may include a resource identifier, wherein the resource identifier includes a QR code, a visual code, an NFC based identifier, an RFID based identifier, a serial number, a URI, a FQDN, or an IP address and/or a TMC identifier.

In some embodiments, at least one data store associated with ARCS 102 may include a TMC library for receiving and storing one or more TMC definitions. In such embodiments, a TMC definition may include a connectivity map or information usable in creating a connectivity map. In some embodiments, a connectivity map may indicate connections of physical NTM system communication ports to physical resource communication ports associated with a particular TMC. For example, a connectivity map may indicate which ports of a test system (e.g., NTM system 120) are connected to ports of a SUT (e.g., physical resource 200).

In some embodiments, at least one data store associated with ARCS 102 may include a device connectivity library for storing device image recognition and/or device identification information and associated device-specific communication port AR overlay information. For example, a device connectivity library may include device identifiers and related AR element information usable for assisting a user with performing a cabling task or portion thereof (e.g., audio instructions and overlay graphics and relative anchor location information for emphasizing particular ports of physical resource 200).

In some embodiments, ARCS 102 or CTC 104 may be configured for processing a captured image of a device (e.g., a test system device or a DUT/SUT device) to identify the device and confirm that it is involved in a particular TMC, where confirmation involves accessing corresponding TMC definition information (e.g., in a TMC library or related data store).

In some embodiments, ARCS 102 or CTC 104 may be configured for accessing device connectivity information (e.g., in a device connectivity library) and for providing cabling task related information including an AR element (e.g., a visual overlay image or graphic) that is to be displayed or overlaid on top of user-captured image(s) or video (e.g., to a test system user via ARCS client app 114).

In step 404, cabling instructions for instructing the user to perform a cabling task (e.g., associated with a TMC definition or a related objective, or a network monitoring objective) involving connecting at least one cable to one or more physical ports of the physical resource may be received from ARCS 102. For example, after receiving cabling task identification information from ARCS client app 114, ARCS 102 may use the cabling task identification information or a resource identifier therein to identify or determine cabling task related information associated with a corresponding resource and then send the cabling task related information to ARCS client app 114. In this example, the cabling task related information may include cabling instructions and/or data usable for generating or displaying AR elements related to performing a cabling task.

In some embodiments, cabling instructions (e.g., sent from ARCS 102 to ARCS client app 114) may include data usable for generating or displaying AR elements (e.g., settings and/or port layout locations for displaying video overlays) and/or predetermined AR elements (e.g., animations, audio instructions, tactile effects, sound effects, and/or instructional videos).

In some embodiments, ARCS 102 may provide cabling instructions dynamically. For example, ARCS 102 may provide a subsequent cabling instruction after detecting that a current cabling instruction was performed.

In some embodiments, ARCS 102 may provide adjusted cabling instructions in response to detecting an improper connection or detecting that the user did not perform the cabling task correctly.

In step 406, the cabling instructions for instructing the user to perform the cabling task may be provided via a display and using at least one AR element. For example, after receiving cabling instructions for connecting a cable into a management port '2' of a particular firewall appliance, ARCS client app 114 may generate a camera overlay image (e.g., a bright or blinking yellow square) for emphasizing management port '2' and may display the camera overlay image on top of a live or substantially live video of the front of the firewall appliance. In this example, ARCS client app 114 may also augment the live or substantially live video with text, audio, and/or a smaller video or animation (e.g., a picture-in-picture configuration).

In some embodiments, at least one AR element may include a visual overlay element (e.g., a bright blue square or a blinking yellow circle) indicating or emphasizing one of the physical ports to connect the at least one cable, a text element (e.g., a text box) indicating or emphasizing at least a portion of the cabling instructions, a tactile element (e.g., phone buzzing or vibrations) indicating or emphasizing at least a portion of the cabling instructions, or an audio element (e.g., recorded spoken instructions) indicating or emphasizing at least a portion of the cabling instructions. For example, ARCS client app 114 may provide text and/or verbal instructions for assisting a user of UE 112 with performing a cabling task.

In some embodiments, process 400 may also include providing, via the display, feedback indicating whether the user is following the cabling instructions.

In some embodiments, providing feedback indicating whether a user is following cabling instructions may include detecting, via a video portion or image, that a cabling task is completed and after detecting that the cabling task is completed, triggering a network communications test to confirm that the cabling task is completed.

In some embodiments, e.g., once a cabling task is completed, ARCS 102 or CTC 104 or ARCS client app 114 may trigger or facilitate executing a TMC. For example, after determining that a cabling task associated with a TMC involving physical resource 200 is completed, NTM system 120 or a TMC execution engine therein may execute the TMC once a cabling task is completed. In this example, the TMC may include a number of tests for testing one or more performance aspects of physical resource 200 or a related system or network.

In some embodiments, ARCS 102 may include or access at least one data store for storing cabling task instructions associated with a plurality of physical resources, resource identifiers associated with a plurality of physical resources, or port information associated with a plurality of physical resources.

It will be appreciated that process 400 is for illustrative purposes and that different and/or additional actions may be used. It will also be appreciated that various actions described herein may occur in a different order or sequence.

Figure 5:
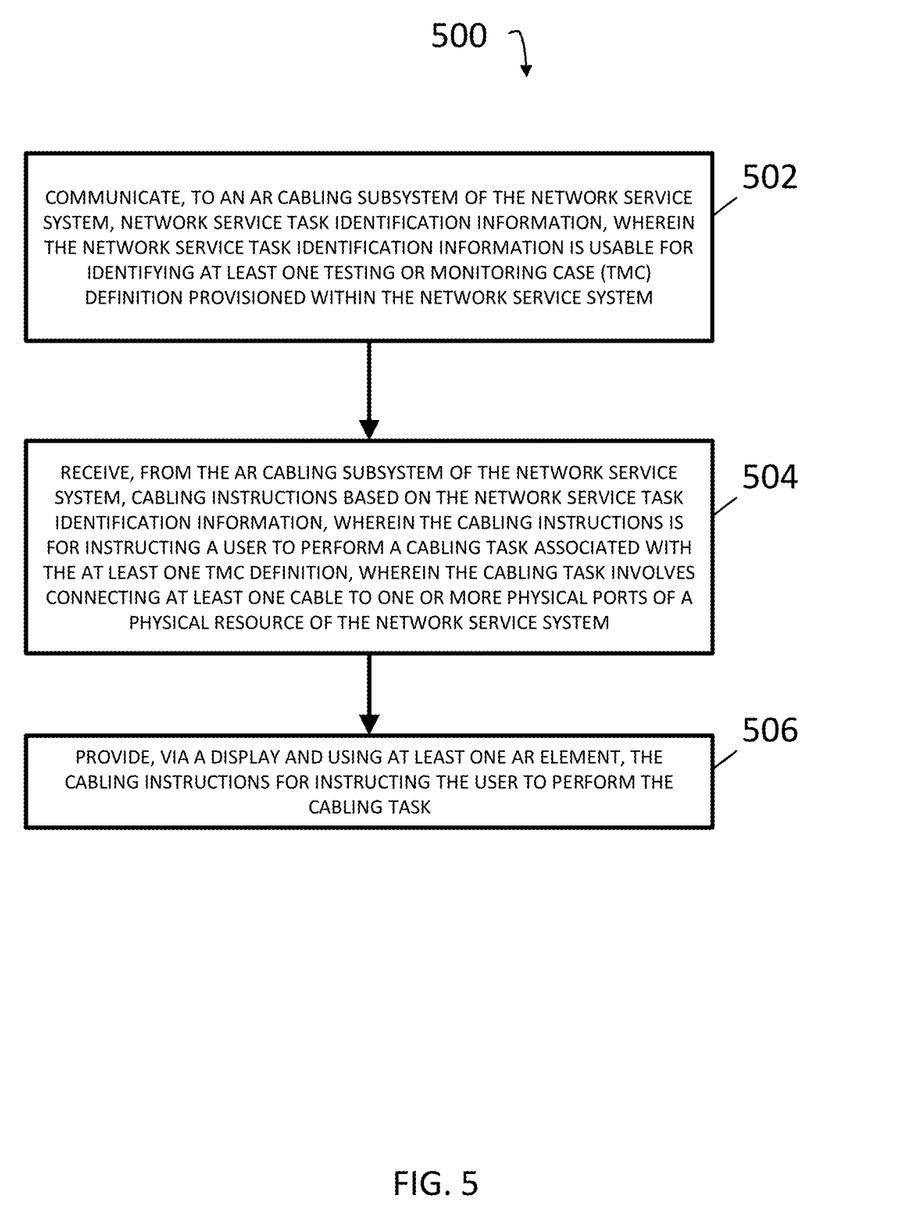
FIG. 5 is a flow chart illustrating an example process for configuring a network service system for performing a network service using AR.

FIG. 5 is a diagram illustrating an example process 500 for configuring a network service system for performing a network service using AR. In some embodiments, process 500, or portions thereof, may be performed by or at a network service system, UE 112, and/or another node or module. In some embodiments, process 500 may include operations or actions represented by steps 502, 504, and/or 506.

As used herein, the term network service system refers to a system (e.g., NTM system 120) that is adapted to test one or more network devices under test (e.g., a switch, a router, a server, a firewall, a gateway, a 5G network element, etc.), or to monitor one or more network devices, or to test and monitor. The term network service is used herein to refer to either a network testing service or a network monitoring service. The term network service task refers to a specific network test case or a network monitoring or security objective.

In some embodiments, a network service system may include a network test system (e.g., Keysight IxNetwork) and a network monitoring and security system (e.g., Keysight VisionOne). In some embodiments, a network service system may include ARCS 102 or related functionality (e.g., an AR cabling subsystem) and may provide AR cabling application functionality facilitated through the use of a web browser application (e.g., Chrome, Safari, etc.) running on a user's mobile device, e.g., UE 112.

In some embodiments, process 500 may be perform at a user device (e.g., UE 112) of a network service system user, wherein the user device is executing an AR cabling application (e.g., ARCS client app 114) associated with the network service system.

Referring to process 500, in step 502, network service task identification information may be communicated to an AR cabling subsystem of a network service system, wherein the network service task identification information is usable for identifying at least one TMC definition indicating at least one testing or monitoring objective provisioned within the network service system.

In some embodiments, network service task identification information may include resource identification information usable for identifying a physical resource in a real-world network environment. For example, a user of UE 112 may send a resource identifier obtained from a video clip or from an RFID or NFC chip along with a request for cabling instructions associated with a physical resource indicated by the resource identifier.

In some embodiments, network service task identification information may include TMC definition identification information usable for identifying at least one TMC definition. For example, a network service system user may select, via a GUI of displaying a visual menu depicting multiple TMCs, a TMC or a related TMC identifier that indicates a TMC definition involving physical resource 200. In this example, the TMC definition may include information usable for testing or monitoring various aspects of physical resource 200, e.g., network related latency, performance, congestion, compliance, security, and/or throughput.

In some embodiments, a network service system user may access, e.g., via ARCS client app 114 or a related GUI, a menu of available TMC definitions from which one may be selected. Once a particular TMC is selected, the network service system user to provide resource identification information to an AR cabling subsystem of a network service system, in a manner described above. Similar processes may be followed in various embodiments used for network monitoring or network testing.

In some embodiments, network service task identification information may include a resource identifier obtained or determined using UE 112. For example, UE 112 can read a resource identifier from an RFID or NFC chip affixed to a physical resource. In another example, UE 112 can identify a resource identifier in an image using OCR technology. In another example, a user can identify a resource identifier by selecting a physical resource via a GUI executing on UE 112.

In some embodiments, network service task identification information may include a resource identifier, wherein the resource identifier includes a QR code, a visual code, an NFC based identifier, an RFID based identifier, a serial number, a URI, a FQDN, or an IP address and/or a TMC identifier.

In some embodiments, at least one data store associated with a network service system may include a TMC library for receiving and storing one or more TMC definitions. In such embodiments, a TMC definition may include a connectivity map or information usable in creating a connectivity map. In some embodiments, a connectivity map may indicate connections of network service system communication ports to physical resource communication ports associated with a particular TMC. For example, a connectivity map may indicate which ports of a network service system (e.g., NTM system 120) are connected to ports of a network device under test (e.g., physical resource 200).

In some embodiments, at least one data store associated with a network service system may include a device connectivity library for storing device image recognition and/or device identification information and associated device-specific communication port AR overlay information. For example, a device connectivity library may include device identifiers and related AR element information usable for assisting a user with performing a cabling task or portion thereof (e.g., audio instructions and overlay graphics and relative anchor location information for emphasizing particular ports of physical resource 200).

In some embodiments, a network service system or logic therein may be configured for processing a captured image of a device (e.g., a test system device or a DUT/SUT device) to identify the device and confirm that it is involved in a particular TMC, where confirmation involves accessing corresponding TMC definition information (e.g., in a TMC library or related data store).

In some embodiments, a network service system or logic therein may be configured for accessing device connectivity information (e.g., in a device connectivity library) and for providing cabling task related information including an AR element (e.g., a visual overlay image or graphic) that is to be displayed or overlaid on top of user-captured image(s) or video (e.g., to a network service system user via ARCS client app 114).

In step 504, cabling instructions based on the network service task identification information may be received from the AR cabling subsystem of the network service system, wherein the cabling instructions is for instructing the user to perform a cabling task associated with the at least one TMC definition, wherein the cabling task involves connecting at least one cable to one or more physical ports of a physical resource of the network service system. For example, after receiving network service task identification information from a user device of a network service system user, the network service system may use the network service task identification information or a resource identifier therein to identify or determine cabling instructions associated with a cabling task and then send the cabling instructions to the user device for generating or displaying AR elements related to performing the cabling task.

In some embodiments, cabling instructions may include data usable for generating or displaying AR elements (e.g., settings and/or port layout locations for displaying video overlays) and/or predetermined AR elements (e.g., animations, audio instructions, tactile effects, sound effects, and/or instructional videos).

In some embodiments, a network service system or logic therein may provide cabling instructions dynamically. For example, a network service system or ARCS 102 therein may provide a subsequent cabling instruction after detecting that a current cabling instruction was performed.

In some embodiments, a network service system or logic therein may provide adjusted cabling instructions in response to detecting an improper connection or detecting that the user did not perform the cabling task correctly.

In step 506, the cabling instructions for instructing the user to perform the cabling task may be provided via a display and using at least one AR element. For example, after receiving cabling instructions for connecting a cable into a management port '2' of a particular firewall appliance, a user device running ARCS client app 114 may generate a camera overlay image (e.g., a bright or blinking yellow square) for emphasizing management port '2' and may display the camera overlay image on top of a live or substantially live video of the front of the firewall appliance. In this example, ARCS client app 114 may also augment the live or substantially live video with text, audio, and/or a smaller video or animation (e.g., a picture-in-picture configuration).

In some embodiments, at least one AR element may include a visual overlay element (e.g., a bright blue square or a blinking yellow circle) indicating or emphasizing one of the physical ports to connect the at least one cable, a text element (e.g., a text box) indicating or emphasizing at least a portion of the cabling instructions, a tactile element (e.g., phone buzzing or vibrations) indicating or emphasizing at least a portion of the cabling instructions, or an audio element (e.g., recorded spoken instructions) indicating or emphasizing at least a portion of the cabling instructions. For example, a user device running ARCS client app 114 may provide text and/or verbal instructions for assisting a network service system user with performing a cabling task.

In some embodiments, an AR cabling application running on a user's mobile device may include a web browser component.

In some embodiments, process 500 may also include providing, via the display, feedback indicating whether the user is following the cabling instructions.

In some embodiments, providing feedback indicating whether a user is following cabling instructions may include detecting, via a video portion or image, that a cabling task is completed and after detecting that the cabling task is completed, triggering a network communications test to confirm that the cabling task is completed.

In some embodiments, e.g., once a cabling task is completed, a network service system or a related entity may trigger or facilitate executing a TMC. For example, after determining that a cabling task associated with a TMC involving physical resource 200 is completed, a network service system or a TMC execution engine therein may execute the TMC once a cabling task is completed. In this example, the TMC may include a number of tests for testing one or more performance aspects of physical resource 200 or a related system or network.

In some embodiments, a network service system or logic therein may include or access at least one data store for storing cabling task instructions associated with a plurality of physical resources, resource identifiers associated with a plurality of physical resources, or port information associated with a plurality of physical resources.

It will be appreciated that process 500 is for illustrative purposes and that different and/or additional actions may be used. It will also be appreciated that various actions described herein may occur in a different order or sequence.

It should be noted that ARCS 102, CTC 104, ARCS client app 114, a network service system, and/or functionality described herein may constitute a special purpose computing device. Further, ARCS 102, CTC 104, ARCS client app 114, a network service system, and/or functionality described herein can improve the technological field of network configuration by providing various techniques or methods for using AR when instructing a user to perform cabling tasks. For example, ARCS 102, CTC 104, ARCS client app 114, a network service system, and/or functionality described herein can be used to provide a user with cabling instructions for various physical resources in a real-world environment. In this example, AR elements may be used to emphasize and/or facilitate the cabling instructions, e.g., a graphic or animation may be overlaid onto a live or substantially live video depicting a physical resource.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for configuring a network service system for performing a network service using augmented reality, the method comprising:

at a user device of a network service system user, wherein the user device is executing an augmented reality (AR) cabling application associated with the network service system:

communicating, to an AR cabling subsystem of the network service system, network service task identification information, wherein the network service task identification information is usable for identifying at least one testing or monitoring case (TMC) definition provisioned within the network service system, wherein the network service task identification information includes a TMC definition identifier identifying a first TMC definition defining a first TMC and a resource identifier identifying a physical resource to be test or monitored in the first TMC;

receiving, from the AR cabling subsystem of the network service system, cabling instructions based on the network service task identification information, wherein the cabling instructions is for instructing the user to perform a cabling task associated with the at least one TMC, wherein the cabling task involves connecting at least one cable to one or more physical ports of a physical resource of the network service system; and providing, via a display and using at least one AR element, the cabling instructions for instructing the user to perform the cabling task; and at the AR cabling subsystem of the network service system and prior to the AR cabling subsystem of the network service system sending the cabling instructions to the user device:

receiving the network service task identification information including the TMC definition identifier and the resource identifier;

identifying, using the TMC definition identifier, the first TMC definition, wherein the first TMC definition includes a connectivity map indicating one or more ports for connecting the network service system to the physical resource for the first TMC;

determining, using the connectivity map and the resource identifier, the cabling instructions indicating how to connect the network service system to the physical resource for the first TMC; and sending, to the user device, the cabling instructions.

2. The method of claim 1 wherein the AR cabling application includes or utilizes a web browser.

3. The method of claim 1 comprising providing feedback indicating whether the user is following the cabling instructions by detecting, via a video portion or image, that the cabling task is completed and after detecting that the cabling task is completed, triggering a network communications test to confirm that the cabling task is completed.

4. The method of claim 1 wherein the at least one AR element includes a visual overlay element indicating one of the physical ports to connect the at least one cable, a text element indicating at least a portion of the cabling instructions, or an audio element indicating at least a portion of the cabling instructions.

5. The method of claim 1 wherein the AR cabling application provides the cabling instructions dynamically, wherein the AR cabling application provides a subsequent cabling instruction after detecting that a current cabling instruction was performed.

6. The method of claim 5 wherein the AR cabling application provides adjusted cabling instructions in response to detecting an improper connection or detecting that the user did not perform the cabling task correctly.

7. The method of claim 1 wherein the network service system includes at least one data store for storing cabling task instructions associated with a plurality of physical resources, resource identifiers associated with a plurality of physical resources, or port information associated with a plurality of physical resources.

8. The method of claim 7 wherein the resource identifier includes a quick response (QR) code, a visual code, a near-field communication (NFC) based identifier, a radio-frequency identification (RFID) based identifier, a serial number, a uniform resource identifier (URI), a fully qualified domain name (FQDN), or an internet protocol (IP) address.

9. The method of claim 1 wherein the physical resource includes a server, a network switch, a computing platform, a chassis, a device, or a hardware component.

10. A system for configuring a network service system for performing a network service using augmented reality, the system comprising:

a user device; and at least one processor, wherein the user device is executing an augmented reality (AR) cabling application using the at least one processor, wherein the AR cabling application is configured for:

communicating, to an AR cabling subsystem of the network service system, network service task identification information, wherein the network service task identification information is usable for identifying at least one testing or monitoring case (TMC) definition provisioned within the network service system, wherein the network service task identification information includes a TMC definition identifier identifying a first TMC definition defining a first TMC and a resource identifier identifying a physical resource to be test or monitored in the first TMC;

receiving, from the AR cabling subsystem of the network service system, cabling instructions based on the network service task identification information, wherein the cabling instructions is for instructing a user to perform a cabling task associated with the at least one TMC, wherein the cabling task involves connecting at least one cable to one or more physical ports of a physical resource of the network service system; and providing, via a display and using at least one AR element, the cabling instructions for instructing the user to perform the cabling task; and a AR cabling subsystem of the network service system, the AR cabling system of the network service system configured for:

prior to the AR cabling subsystem of the network service system sending the cabling instructions to the user device:

receiving the network service task identification information including the TMC definition identifier and the resource identifier;

identifying, using the TMC definition identifier, the first TMC definition, wherein the first TMC definition includes a connectivity map indicating one or more ports for connecting the network service system to the physical resource for the first TMC;

determining, using the connectivity map and the resource identifier, the cabling instructions indicating how to connect the network service system to the physical resource for the first TMC; and sending, to the user device, the cabling instructions.

11. The system of claim 10 wherein the AR cabling application includes or utilizes a web browser.

12. The system of claim 10 wherein the AR cabling application or the network service system is configured for providing feedback indicating whether the user is following the cabling instructions by detecting, via a video portion or image, that the cabling task is completed and after detecting that the cabling task is completed, triggering a network communications test to confirm that the cabling task is completed.

13. The system of claim 10 wherein the at least one AR element includes a visual overlay element indicating one of the physical ports to connect the at least one cable, a text element indicating at least a portion of the cabling instructions, or an audio element indicating at least a portion of the cabling instructions.

14. The system of claim 10 wherein the AR cabling application provides the cabling instructions dynamically, wherein the AR cabling application provides a subsequent cabling instruction after detecting that a current cabling instruction was performed.

15. The system of claim 14 wherein the AR cabling application provides adjusted cabling instructions in response to detecting an improper connection or detecting that the user did not perform the cabling task correctly.

16. The system of claim 10 wherein the network service system includes at least one data store for cabling task instructions associated with a plurality of physical resources, visual identifiers associated with a plurality of physical resources, or port information associated with a plurality of physical resources.

17. The system of claim 16 wherein the resource identifier includes a quick response (QR) code, a visual code, a near-field communication (NFC) based identifier, a radio-frequency identification (RFID) based identifier, a serial number, a uniform resource identifier (URI), a fully qualified domain name (FQDN), or an internet protocol (IP) address.

18. The system of claim 10 wherein the physical resource includes a server, a network switch, a computing platform, a chassis, a device, or a hardware component.

19. A non-transitory computer readable medium having stored thereon executable instructions that when executed by at least one processor of at least one computer cause the at least one computer to perform steps comprising:
   at a user device of a network service system user, wherein the user device is executing an augmented reality (AR) cabling application associated with the network service system:
      communicating, to an AR cabling subsystem of the network service system, network service task identification information, wherein the network service task identification information is usable for identifying at least one testing or monitoring case (TMC) definition provisioned within the network service system, wherein the network service task identification information includes a TMC definition identifier identifying a first TMC definition identifying a first TMC and a resource identifier identifying a physical resource to be test or monitored in the first TMC;
      receiving, from the AR cabling subsystem of the network service system, cabling instructions based on the network service task identification information, wherein the cabling instructions is for instructing the user to perform a cabling task associated with the at least one TMC, wherein the cabling task involves connecting at least one cable to one or more physical ports of a physical resource of the network service system; and
      providing, via a display and using at least one AR element, the cabling instructions for instructing the user to perform the cabling task; and
   at the AR cabling subsystem of the network service system and prior to the AR cabling subsystem of the network service system sending the cabling instructions to the user device:
      receiving the network service task identification information including the TMC definition identifier and the resource identifier;
      identifying, using the TMC definition identifier, the first TMC definition, wherein the first TMC definition includes a connectivity map indicating one or more ports for connecting the network service system to the physical resource for the first TMC;
      determining, using the connectivity map and the resource identifier, the cabling instructions indicating how to connect the network service system to the physical resource for the first TMC; and
      sending, to the user device, the cabling instructions.

20. The non-transitory computer readable medium of claim 19 wherein the AR cabling application includes or utilizes a web browser.

* * * * *